INVENTORS.
WILLIAM S. MC EWAN
HANS B. JONASSEN
CARL H. MORLEY
BY
ROY MILLER
ATTORNEY.

3,728,271

CHEMILUMINESCENT FORMULATION

William S. McEwan, China Lake, Calif., Hans B. Jonassen, New Orleans, La., and Carl H. Morley, Ridgecrest, Calif., assignors to the United States of America as represented by the Secretary of the Navy Filed Feb. 26, 1969, Ser. No. 803,526
Int. Cl. C09k *1/06*
U.S. Cl. 252—188.3 CL 6 Claims

ABSTRACT OF THE DISCLOSURE

An improved chemiluminescent formulation consisting essentially of tetrakis(disubstituted-amino)ethylene, polyethylene and a lithium halide for use in climates where the humidity reaches 85% or higher.

GOVERNMENT INTEREST

The invention described herein may be manufactured and used by or for the Government of the United States of America for governmental purposes without the payment of any royalties thereon or therefor.

BACKGROUND OF THE INVENTION

The invention relates to an improved chemiluminescent formulation capable of uniform light emission on exposure to the atmosphere where the relative humidity is extrtemely high; more particularly the invention is for a new formulation containing tetrakis(dimethylamino) ethylene.

Tetrakis(dimethylamino)ethylene (TMAE) is an oxyluminescent compound first reported by Pruett et al., J. Am. Chem. Soc., 72, 3646(1950). It is known that a small amount of water, alcohol, or other protonic material must be present for light to be emitted by this composition. Cline in Pat. No. 3,311,564 which issued on Mar. 28, 1967 discloses a wide variety of operable non-acidic dehydrating agents or desciccants which may be employed to remove excess water from tetrakis(dimethylamino) ethylene (TMAE) and to control water vapor or liquid that may be introduced by the air or oxygen admitted to the TMAE to produce oxyluminescence. Materials effective in this manner include alkali or alkaline earth metal hydroxides, oxides, and peroxides which react with water to form alkali or alkaline earth metal hydroxides. Although improved light output has resulted, a need remains for still better light output from these oxyluminescent materials under humid conditions. The present improved oxyluminescent formulation provides multifold light output for longer duration over similar compositions known to the art under environmental conditions of high relative humidity (85% R.H. et at 85° F.).

SUMMARY OF THE INVENTION

The invention relates to an improved chemiluminescent formulation containing tetrakis(dimethylamino)ethylene which when exposed to air at a relative humidity of over 85% shows great light intensity over a comparative long period of time.

It is the general purpose of this invention to provide an improved chemiluminescent formulations for use in nocturnal markers and signals which produce uniform light emission when exposed to a humid atmosphere. These new formulations provide material for use on prepackaged tapes which on exposure to air provide quick nocturnal illumination of designated areas on water or land during emergency conditions. The present oxyluminescent formulation is a barely wet powder which lends itself to packaging in small sealed containers for simple and expeditious handling.

The invention will be more fully described with reference to the accompanying graphs which compare the present formulations with control or reference formulations.

DESCRIPTION OF THE INVENTION

Figure 1:
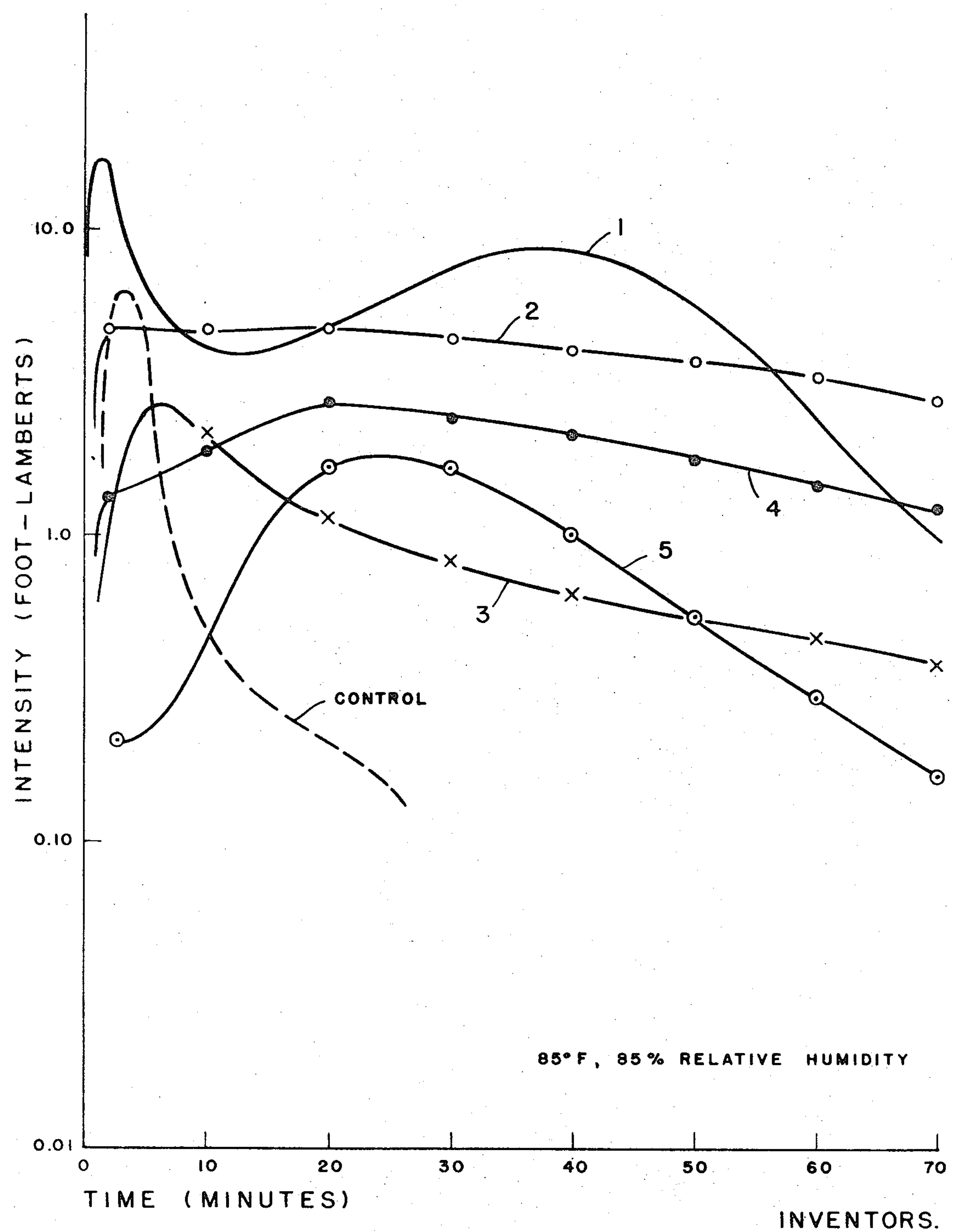
FIG. 1 is a graph comparing the new formulations containing lithium chloride with a control formulation which does not contain a lithium halide.

In accordance with the present invention 5 to 25% lithium halide was mixed with about 35% (disubstituted-amino)ethylene and from 20 to 60% by weight powdered polyethylene (40 mesh) to form a barely wet powder. Mixing took place in an inert atmosphere.

The lithium halide which are operable are lithium chloride, lithium bromide, lithium iodide and lithtium fluoride. Lithium chloride is more efficient on a cost and weight basis, but lithium bromide is more effective on a molar basis. The other lithium halides are expensive and hazardous to handle.

Specific tetrakis(disubstituted-amino)ethylenes operable as oxyluminescent material in the formulations of tthis invention include tetrakis(dimethylamino)ethylene,
tetrakis(N-pyrro-divinyl)ethylene,
1,1′,3′,3′-tetramethyl-$\Delta^{2,2'}$-bis(imidazolidine),
1′,1′,3,3′-ttetraethyl-$\Delta^{2,2'}$-bis(imidazolidine), and
tetrakis(dimethylamino-methyleneamino)ethylene.

Tetrakis(dimethylamino)ethylene is readily available and is especially suitable.

When exposed to the air the primary oxidation product of tetrakis(dimethylamino)ethylene (TMAE) is tetramethylurea (TMU) which is a severe quencher of light emission. It is postulated that the lithium halides (LiCl, LiBr, LiI or LiF) form a complex with the by-product TMU, thus $$\mathrm{LiCl}+n\mathrm{TMU}\rightarrow \mathrm{LiCl}\cdot n\mathrm{TMU}$$

thereby suppressing the quenching effect for some time caused by the excess tetramethylurea (TMU).

The following examples will describe the invention in more detail. The percentage of the ingredients are expressed in parts by weight.

EXAMPLE I

| Ingredients: | Percent by weight |
|---|---|
| Polyethylene (40 mesh particle size) | 45 |
| Lithium chloride | 20 |
| Tetrakis(dimethylamino)ethylene | 35 |

The ingredients were blended together under inert conditions and at about 70° C. to form a barely wet powder. The material was placed in a sealed container and stored at ordinary temperature.

A control composition comprising 30% dimethylpolysiloxane, 10,000 centistokes, 35% polyethylene and 35% tettrakis(dimethylamino)ethylene was similarly prepared and stored in a sealed container.

A sample of the control composition was exposed to an atmosphere of high humidity (85–100% R.H. at 85° F.). The light emitted was measured in foot-lamberts and the duration in seconds. At the same time a sample of the new formulation was exposed to the same humid conditions and light emission measured in the same way. The results of these light emission tests are summarized in the following table as taken from FIG. 1.

| Type composition | Brightness, foot lamberts | | |
|---|---|---|---|
| | Total emission relative | Peak intensity | Time 1.0 lambert minutes |
| Example I | 30 | 17.5 | 70.0+ |
| Control | 1 | 6.4 | 7.0− |

These results show the superiority of the new formulation

EXAMPLE II

| Ingredients: | Percent by weight |
|---|---|
| Silicone fluid | 10 |
| Polyethylene | 35 |
| Lithium chloride | 20 |
| Tetrakis(dimethylamino)ethylene | 35 |

The above ingredients were blended in accordance with the method described in Example I. When exposed to an atmosphere of high relative humidity (85% R.H. at 85° F.) the following results were recorded and are plotted on FIG. 1.

Peak intensity ________________foot-lamberts__ 8.3
Time to 1 foot lambert ____________minutes__ 70.0+

EXAMPLE III

| Ingredients: | Percent by weight |
|---|---|
| Silicon fluid (dimethylpolysiloxane) | 25 |
| Polyethylene (40 mesh particle size) | 20 |
| Lithium chloride | 20 |
| Tetrakis(dimethylamino)ethylene | 35 |

The ingredients were processed in accordance with the procedure set forth in Example I, and a sample of this batch was exposed to high humid atmosphere (85% R.H. at 85° F.) with the following results which are shown plotted on FIG. 1.

Peak intensity ________________foot-lamberts__ 17.5
Time to 1 foot lambert _______________minutes__ 70+

This formulation shows a multifold superiority under the same conditions over the control or reference formulation set out in the table following Example I herein.

EXAMPLE IV

| Ingredients: | Percent by weight |
|---|---|
| Silicon fluid (dimethylpolysiloxane) | 15 |
| Polyethylene (40 mesh) | 30 |
| Lithium chloride | 20 |
| Tetrakis(dimethylamino)ethylene | 35 |

The above formulation when exposed to the same humid atmospheric conditions as Examples I–III and the control formulation gave the following results which are also shown on FIG. 1.

Peak intensity __________________foot-lamberts__ 2.9
Time to 1 foot-lambert _______________minutes__ 40

EXAMPLE V

| Ingredients: | Percent by weight |
|---|---|
| Silicon fluid (dimethylpolysiloxane) | 20 |
| Polyethylene powder | 25 |
| Lithium chloride | 20 |
| Tetrakis(dimethylamino)ethylene | 35 |

The ingredients were blended together as herein described to form a barely wet powder. A sample exposd to the same high relative humidity gave the following results which are also shown in FIG. 1.

Peak intensity __________________foot-lamberts__ 1.9
Time to 1 foot-lambert _______________minutes__ 40

EXAMPLE VI

| Ingredients: | Percent by weight |
|---|---|
| Polyethylene (40 mesh particle size) | 45 |
| Lithium chloride | 20 |
| Tetrakis(dimethylamino)ethylene | 35 |

As hereinabove set out the ingredients were mixed together forming a barely wet powder. When exposed to the same atmospheric conditions (85% R.H., 85° F.), the following results were obtained and are shown also on FIG. 2.

Peak intensity ________________foot-lamberts__ 11.4
Time to 1 foot-lambert _______________minutes__ 70+

This formulation also shows multifold improvement in light intensity and duration over the formulations known to the art.

EXAMPLE VII

| Ingredients: | Percent by weight |
|---|---|
| Polyethylene (40 mesh particle size) | 60 |
| Lithium chloride | 5 |
| Tetrakis(dimethylamino)ethylene | 35 |

The above formulation was prepared as in Example I. A sample was exposed to the same highly humid atmospheric conditions as Examples I–IV herein with the following results.

Peak intensity __________________foot-lamberts__ 13
Time to 1 foot-lambert _________________minutes__ 34

Again this formulation shows great superiority over the control or reference composition exposed to the same atmospheric conditions and other compositions containing tetrakis(dimethylamino)ethylene known to the art.

EXAMPLE VIII

| Ingredients: | Percent by weight |
|---|---|
| Polyethylene (40μ particle size) | 50 |
| Lithium chloride | 14 |
| Tetrakis(dimethylamino)ethylene | 35 |

Figure 2:
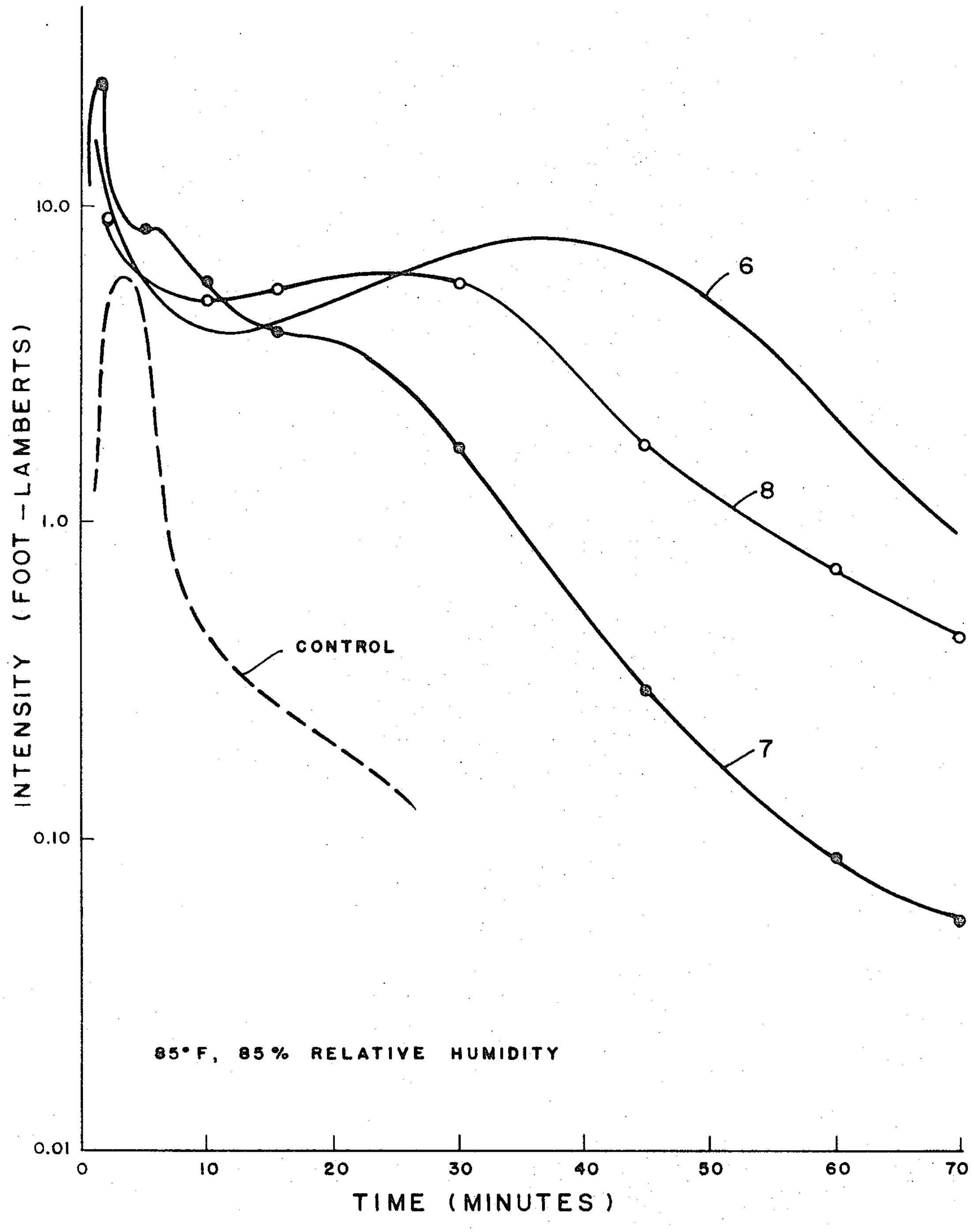
FIG. 2 is another graph comparing still more formulations containing lithium chloride with a control or reference formulation which does not contain a lithium halide.

A sample of the above formulation was exposed to the same atmospheric conditions (85% R.H., 85° F.) with the following results which are also plotted on FIG. 2.

Peak intensity __________________foot-lamberts__ 9
Time to 1 foot-lambert ________________minutes__ 54

EXAMPLE IX

| Ingredients: | Percent by weight |
|---|---|
| Polyethylene (40 mesh particle size) | 40 |
| Lithium bromide | 20 |
| Tetrakis(dimethylamino)ethylene | 40 |

The ingredients were processed under inert conditions as herein described. The composition was stored in sealed containers and samples were exposed to an atmosphere of high humidity (85% R.H., 85° F.).

Total light emission _____foot-lambert minutes__ 350
Peak intensity ________________foot-lambers__ 9.7
Time to 1 foot-lambert _____________minutes__ 100+

EXAMPLE X

| Ingredients: | Percent by weight |
|---|---|
| Polyethylene (40 mesh particle size) | 40 |
| Lithium chloride | 20 |
| Tetrakis(dimethylamino)ethylene | 40 |

The ingredients were processed under inert conditions as herein described and the composition stored in sealed containers. Samples were exposed to an atmosphere comparable to that in which the majority of the samples disclosed herein were tested, that is, 85° F. and 85% relative humidity. The following results were obtained:

Integrated output _______foot-lamberts minutes__ 530
Peak intensity ________________foot-lamberts__ 28
Time to 1 foot lambert ______________minutes__ 100+

Figure 3:
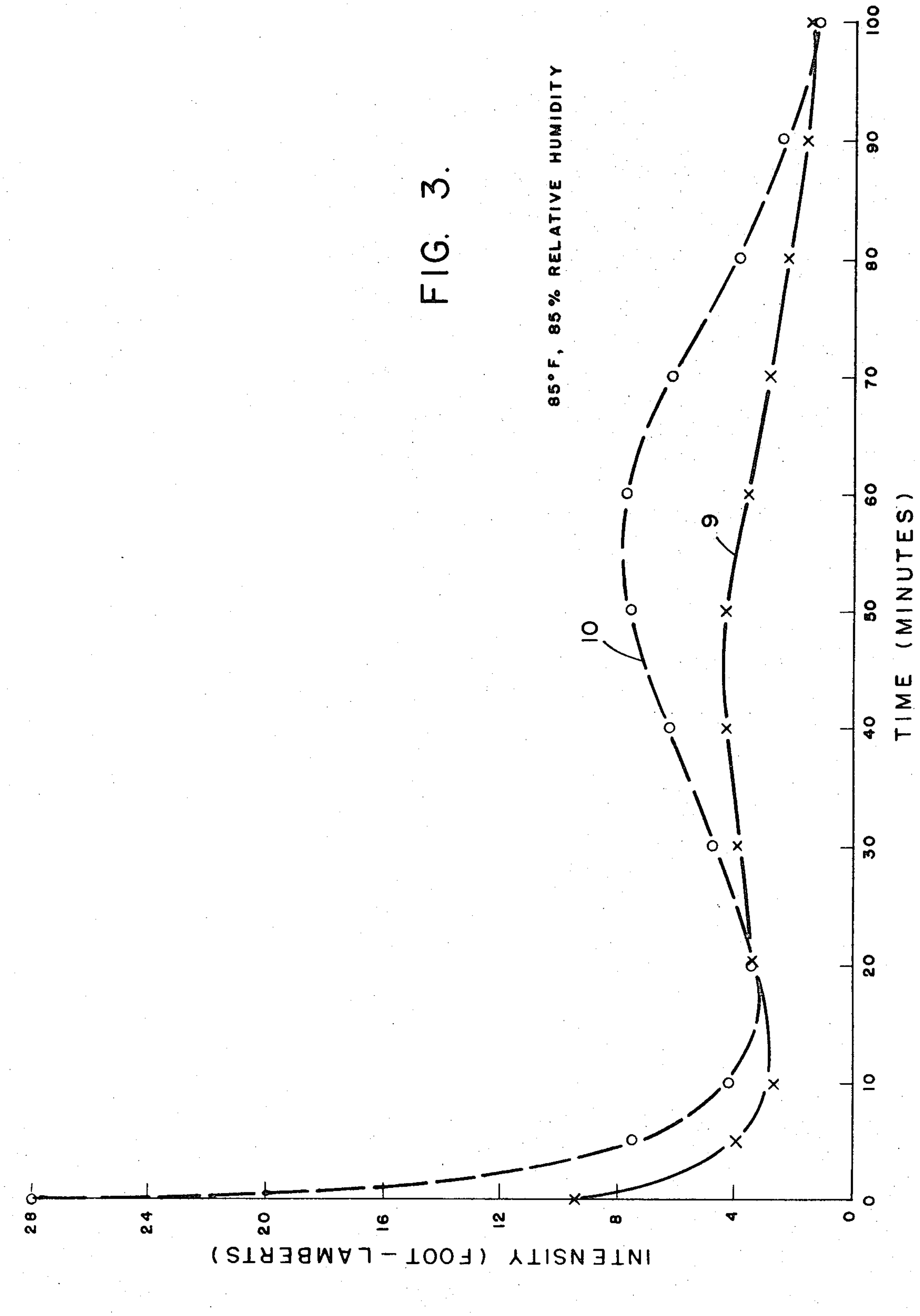
FIG. 3 is a graph comparing the new formulations of this invention, one containing lithium bromide and one containing lithium chloride.

In FIG. 3 Examples IX and X are compared. Both show superior results over other tetrakis(dimethylamino)ethylene compounds known and also indicates the lithium chloride containing formulation is somewhat superior to the lithium bromide containing formulation. However, both are new and useful. The formulations containing lithium bromide are more effective on a molar basis, and the formulations containing lithium chloride are greatly superior to the chemiluminescent formulations known to the art and are more efficient on a weight and cost basis.

The following table shows the effectiveness of lithium chloride and lithium bromide when mixed with tetrakis-(dimethylamino)ethylene and polyethylene in comparison to other inorganic salts which were prepared and the light output recorded at 30° C. and 5% relative humidity.

TABLE

Effect of Various Inorganic Salts on Light Output at 30° C. and 5% Relative [a] Humidity

| Sample No. | Salt additive | Total light emission (arbitrary units) | Duration, minutes |
|---|---|---|---|
| 1 | None[b] | 120 | 60 |
| 2 | LiCl[c] | 370 | 200 |
| 3 | LiBr | 470 | 230 |
| 4 | $LiClO_4$ | 83 | 10 |
| 5 | LiOH | 97 | 25 |
| 6 | $MgCl_2$ | 108 | 20 |
| 7 | $Mg(ClO_4)_2$ | 65 | 10 |
| 8 | $CaCl_2$ | 172 | 60 |
| 9 | $Ca(ClO_4)_2$ | 20 | 10 |
| 10 | CaO | 88 | 40 |
| 11 | BaO | 98 | 80 |
| 12 | $BaCl_2$ | 122 | 60 |
| 13 | CsF | 51 | 70 |

[a] Powder samples of approximately 1 cm. depth.
[b] Control sample of 35 wt. percent TMAE, 65 wt. percent PE.
[c] Samples with additives of 20 wt. percent salt, 35 wt. percent TMAE and 45 wt. percent PE.

The oxyluminescent peraminoethylene formulations of this invention comprising a lithium halide and polyethylene, are particularly suitable for use as emergency light sources in a "micro-environment" such as in a non-beaming flashlight, a cockpit light, etc.

What is claimed is:

1. An improved chemiluminescent formulation comprising
from 5 to 20% by weight lithium halide,
from 20 to 60% by weight polyethylene,
from 30 to 35% by weight tetrakis(disubstituted-amino)ethylene,
said lithium halide being a member selected from the group consisting of a chloride, a bromide, an iodide and a fluoride.

2. The formulation of claim 1 containing additionally dimethylpolysiloxane.

3. The formulation of claim 1 wherein the halide is lithium chloride.

4. The formulation of claim 1 wherein the halide is lithium bromide.

5. The formulation in accordance with claim 1 wherein the halide is lithium chloride and the tetrakis(disubstituted-amino)ethylene is tetrakis(dimethylamino)ethylene.

6. The formulation in accordance with claim 1 wherein the halide is lithium bromide and the tetrakis(disubstituted-amino)ethylene is tetrakis(dimethylamino)ethylene.

No references cited.

REUBEN EPSTEIN, Primary Examiner

U.S. Cl. X.R.

252—301.3